Figure 4:
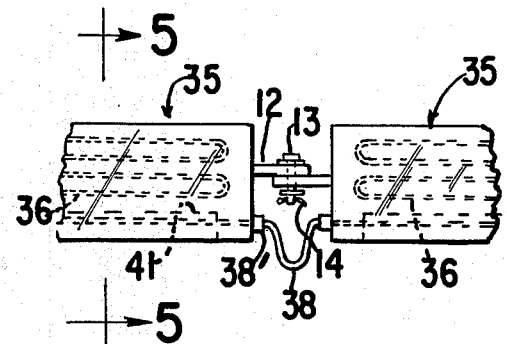

United States Patent [19]

Ross

[11] 4,356,094
[45] Oct. 26, 1982

[54] METHOD AND APPARATUS FOR CONTROLLING WATER SURFACE ACTIVITY

[75] Inventor: Sigmund L. Ross, Brooklyn, N.Y.

[73] Assignee: David K. Shuffman, New York, N.Y.

[21] Appl. No.: 19,564

[22] Filed: Mar. 12, 1979

Related U.S. Application Data

[63] Continuation of Ser. No. 849,201, Nov. 9, 1977, abandoned.

[51] Int. Cl.³ .................. B01D 17/00; E02B 3/00
[52] U.S. Cl. ............................ 210/774; 210/776;
210/242.3; 210/923; 405/22; 405/63
[58] Field of Search ............. 210/71, 242 S, DIG. 26,
210/774, 776, 242.3, 923; 405/22, 62–74

[56] References Cited

U.S. PATENT DOCUMENTS

| | | | |
|---|---|---|---|
| 1,264,756 | 4/1918 | Begg | 405/22 |
| 2,492,949 | 1/1950 | Brasher | 405/22 X |
| 3,614,873 | 10/1971 | Cole et al. | 210/242 S X |
| 3,630,033 | 12/1971 | Tuttle et al. | 405/71 |
| 3,822,555 | 7/1974 | Strawn et al. | 405/22 |
| 4,031,707 | 6/1977 | Ross et al. | 210/71 X |

Primary Examiner—Robert H. Spitzer
Attorney, Agent, or Firm—Kenyon & Kenyon

[57] ABSTRACT

The surface activity (more especially waves) of a body of water is reduced by providing a succession of booms at least partially surrounding said body of water (preferably moored so as to be substantially stationary) so that the surface of said body of water (preferably a major proportion or all of said surface) is substantially isolated by the presence of said booms in relation to the surface of water peripherally external with respect to said booms and the surface activity of said body of water is reduced by the distribution on the surface of said body of water as thus isolated by said succession of booms of a material at a cryothermal temperature at or below the freezing point of the water that preferably is in the form of a cascade of ice particles. Preferably surfaces of succession booms that face the so isolated body of water present material at a cryothermal temperature that is in contact with the water surface. Petroleum constituting an oil spill may be cleaned up and recovered while the surface of said body of water is isolated as aforesaid by said booms and preferably also is calmed by said distribution thereon of said material at a cryothermal temperature and preferably also by movement toward said spill of boom means presenting a material at said cryothermal temperature that is in contact with the water surface and that faces said oil spill.

12 Claims, 6 Drawing Figures

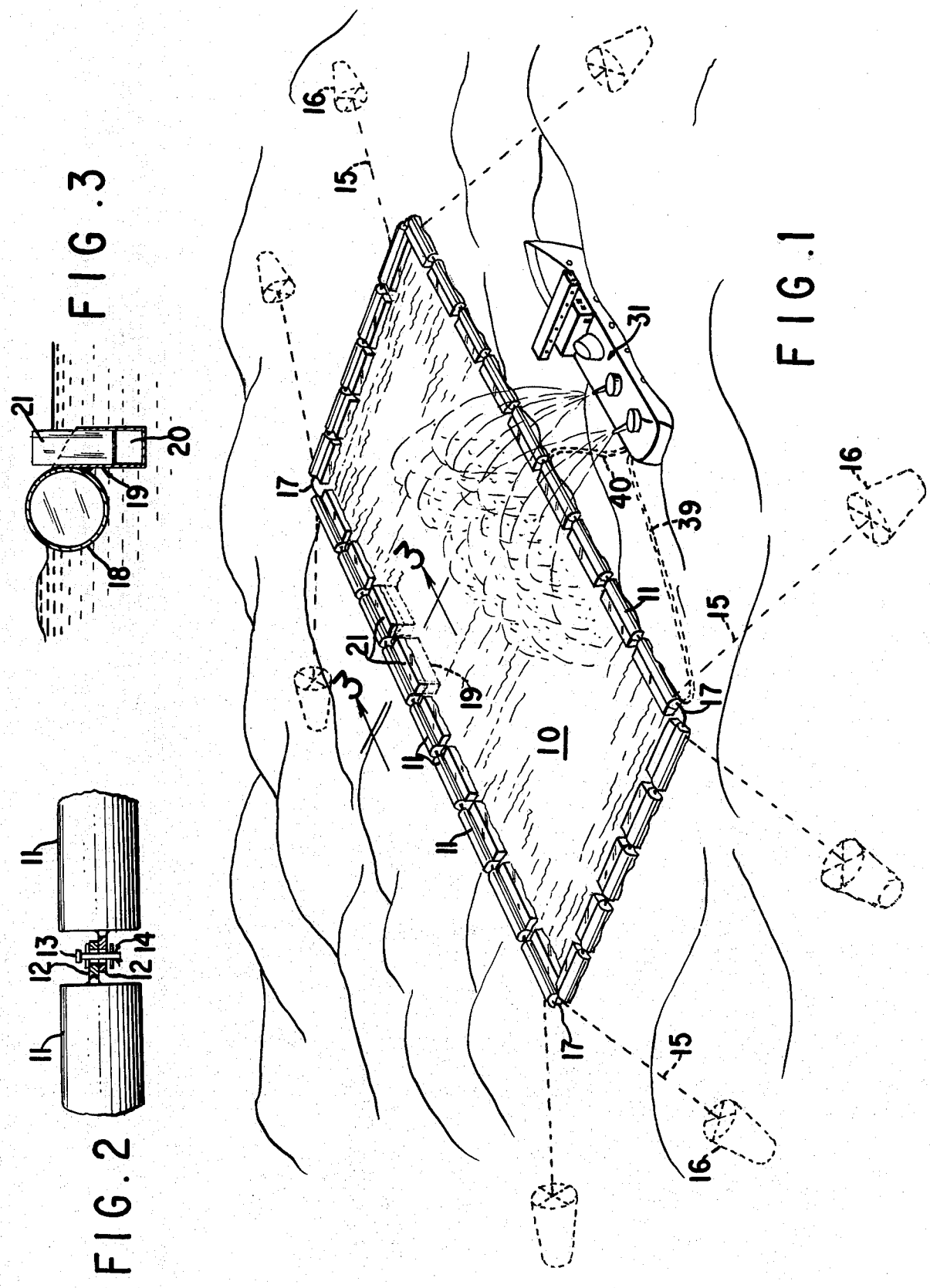

METHOD AND APPARATUS FOR CONTROLLING WATER SURFACE ACTIVITY

This is a continuation of application Ser. No. 849,201 filed Nov. 9, 1977, now abandoned.

This invention is concerned with reducing the surface activity of a body of water. It is concerned especially with reducing wave activity although it also contemplates the reduction of current activity either per se or as combined with wave activity.

There are a number of circumstances under which the ability to reduce the surface activity of water can be of major importance. For example, it may be important during the installation or during the repair of an offshore oil recovery installation. It also may be important in facilitating a salvage operation. Excessive wave and current activity also can greatly hamper the recovery of petroleum constituting an oil spill or other floating contamination.

It is an object of this invention to provide a practical method whereby it may be possible, wherever it may become desirable to do so, to provide in a particular area a body of water wherein the surface activity is substantially reduced in relation to adjoining water surface.

According to this invention the surface activity of a body of water is reduced by providing a succession of booms at least partially surrounding it so that the surface of the body of water is substantially isolated by the presence of the booms in relation to the surface of water peripherally external with respect to the booms and surface activity of the so surrounded body of water is substantially reduced by subjecting the surface of the body of water to a cold or super cold substance or substances that chills the water at and adjacent the surface so as to increase the internal friction therein with possible formation of ice. The chilling may be accomplished by distributing on the surface of the body of water a material at a cryothermal temperature, namely, a temperature corresponding to the freezing point of the water at sea level or lower, the freezing point of sea water being substantially 29° F.

The material at cryothermal temperature may be a cryogenic material such as particles of solid carbon dioxide (dry ice) or droplets of liquid nitrogen that are distributed preferably so as to cascade down on the surface of the body of water. Alternatively, one may employ particles of solid carbon dioxide, or water ice particles chilled down by liquid nitrogen. Preferably the material at cryothermal temperature is produced from a stream of water by converting it into ice particles by some appropriate expedient such as contacting the stream of water with a cryogenic material such as liquid nitrogen or particles of solid carbon dioxide. The preferred method which likewise is the least costly is to project a stream of water through a nozzle so as to fall as a cascade on the surface of the body of water and either before or after it leaves the nozzle convert the stream of water into ice particles at a temperature considerably below the freezing point of the water. Means for projecting a stream of ice particles are well known as, for example, equipment of the type commonly used at ski areas to apply artificially produced snow to ski slopes. The material at cryogenic temperature ordinarily is distributed from a source such as a boat that is external with respect to the periphery of the succession of booms but is sufficiently adjacent to the succession of booms so that the material at cryothermal temperature may be projected for effective distribution on the surface of the body of water. To better accomplish such distribution the material may be projected from a plurality of projection sources and the source or sources may be movable relative to the booms. The material at cryothermal temperature preferably is projected so as to fall as a cascade onto the surface of the body of water. While it may be caused to fall as a cascade onto the surface of the water by projecting it horizontally or downwardly, it is ordinarily preferable to project it upwardly so as to get a better trajectory for wider distribution and so that it will fall more effectively as a rain or spray onto the surface of the water. When the material at a cryothermal temperature is distributed on the surface of the body of water as a cascade or rain comprising ice particles that fall on the body of water at substantial velocity, the resulting impact effect as well as the cold state of the particles acts to quell surface activity in much the same way that hail is effective to flatten the surface of the sea even in a high wind.

It may be of some advantage to also chill down or even form ice spicules and crystals in water that is in adjacent peripherally external relation with respect to the booms, because any tendency of wave or current to agitate the surface of the body of water protected by the booms must first attack the external perimeter of the succession of booms.

The succession of booms may be provided in different configurations depending on a given need. When there is wave action imparted by wind the direction of the wave action advance depends on the predominant direction of the wind. In such case the desired isolating effect provided by the boom does not necessarily require that the body of water be protected by completely surrounding it with the booms. For many purposes it is sufficient to provide a succession of booms along the windward margin of the body of water to be protected coupled with such additional booms as may be desirable to protect the sides of the body of water that extend rearwardly from the windward margin. Preferably, at least the major portion of the surface of the body of water is isolated by the presence of the booms in relation to water surface peripherally external with respect to the booms. In some instances it may actually be desirable to provide an opening in the succession of booms along a lee margin of the body of water so as to facilitate entry and exit of vessels carrying equipment of one kind or other for the task at hand. For example, in the case of an oil spill the area of the oil spill that is to be cleaned up may be isolated by a succession of booms that has an opening therein along or adjacent the lee margin for the introduction of equipment for use in cleaning up and recovering the spilled oil while the surface activity of the body of water is quieted down in the manner that has been described hereinabove. On the other hand, for certain purposes such as installation or repair of offshore oil recovery equipment it may be desirable to completely surround the body of water by the succession of booms while work is actually in progress.

Usually when there is surface activity occasioned by wind or current any succession of booms that may be put in place tends to drift and for this reason the practice of this invention normally contemplates that the succession of booms will be moored by mooring means which maintains the booms in a substantially stationary location. Of course, if there is little or no tendency to drift or if the desired protection is of such short duration that a certain amount of drift may be tolerated, it would not be necessary to secure the booms to mooring means.

The booms may be provided in any way that is the most convenient for the purposes. They may be made of wood, or in the form of elongated hollow metal bodies or in the form of elongated porous plastic bodies. The booms are ordinarily made so that they may be secured together in end-to-end pivotal relation by some securing means which permits ready attachment and detachment. While not essential to the practice of this invention, the booms preferably are provided so as to present a material at a cryothermal temperature on the surfaces thereof facing said body in position to be in contact with the water adjacent the surface thereof. A preferred practice in this regard is to attach rectangular blocks of solid carbon dioxide to the booms so as to face the body of water to be protected. Alternatively the booms may present a surface chilled by refrigeration. The chilling action provided by the material at cryothermal temperature that is presented by the booms in contact with the water serves to quiet the surface activity immediately adjacent the booms and thereby serves to substantially increase the effectiveness of the booms in accomplishing a reduction in surface activity in relation to surface activity of the water peripherally external with respect to the booms.

One of the applications of the present invention wherein it is of great advantage to be able to reduce the surface activity of a body of water as herein described is in connection with attempts to clean up and recover petroleum oil that has been spilled on water. Any such attempt obviously is hampered by excessive wave or current activity and any technique for oil spill clean-up and recovery that may be employed is greatly benefited by reducing the surface activity to a minimum utilizing the method of this invention.

In my U.S. Pat. No. 4,031,707 I have disclosed improved method and apparatus for cleaning up and recovering oil spills wherein the floating oil is herded utilizing booms that carry, so as to be in contact with the water at and adjacent the water surface, a cryothermal material of the character hereinabove described which preferably is in the form of elongated blocks of solid carbon dioxide. As aforesaid the oil floating on the water tends to be repelled by and moved away from the material at cryothermal temperature and as disclosed in said patent by disposing the booms with the material at cryothermal temperature facing the oil spill and by then advancing the booms toward the oil spill, the oil constituting the oil spill may be herded into any area where the oil constituting the oil spill becomes of greater concentration and more readily removed and recovered. While the oil constituting the oil spill can be successfully recovered when utilizing the method and apparatus described in my said patent notwithstanding substantial surface activity, the herding and recovery of the oil may be accomplished much more effectively and expeditiously when the method of the present invention also is availed of to quite the surface of the water on which the oil is floating. To this end, for example, the succession of booms which provide protection for the body of water to be cleaned up may comprise an opening in the lee margin thereof for permitting boom means to be moved therethrough so as to face the oil spill with the oil spill between said boom means and the succession of booms which ordinarily would be moored so as to be substantially stationary unless there is little tendency for the succession of booms to drift. Since the boom means that has been brought in carries the blocks of solid carbon dioxide or other material at a cryothermal temperature so as to face the oil spill, movement of the boom means toward the succession of booms causes the oil to move away from the solid carbon dioxide as it is advanced so as to accomplish herding of the floating oil into a more restricted confined area or region of the water surface protected by the succession of booms so as to enable it to be much more readily removed and recovered. The effectiveness of the herding and confining action between the movable boom means and the succession of booms that protect the body of water is furthered when, as is preferable, the booms comprised in the succession of booms also carry blocks of solid carbon dioxide or other material at a cryothermal temperature, which have the effect of causing the floating oil to be repelled therefrom. While the improvements in oil spill clean-up and recovery obtained in this way are to be regarded as within the purview of this invention, nevertheless in preferred practice the surface of the body of water having the oil spill thereon also is subjected to the cascading thereon of ice particles or to other distribution thereon of material at a cryothermal temperature thereby calming the surface activity as the boom means carrying the blocks of solid carbon dioxide is advanced thereby not only greatly facilitating the herding action but also causing the oil to be concentrated in a condition which by virtue of its lowered temperature facilitates its removal and recovery.

Figure 5:
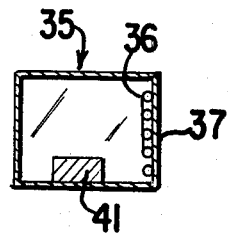
Figure 6:
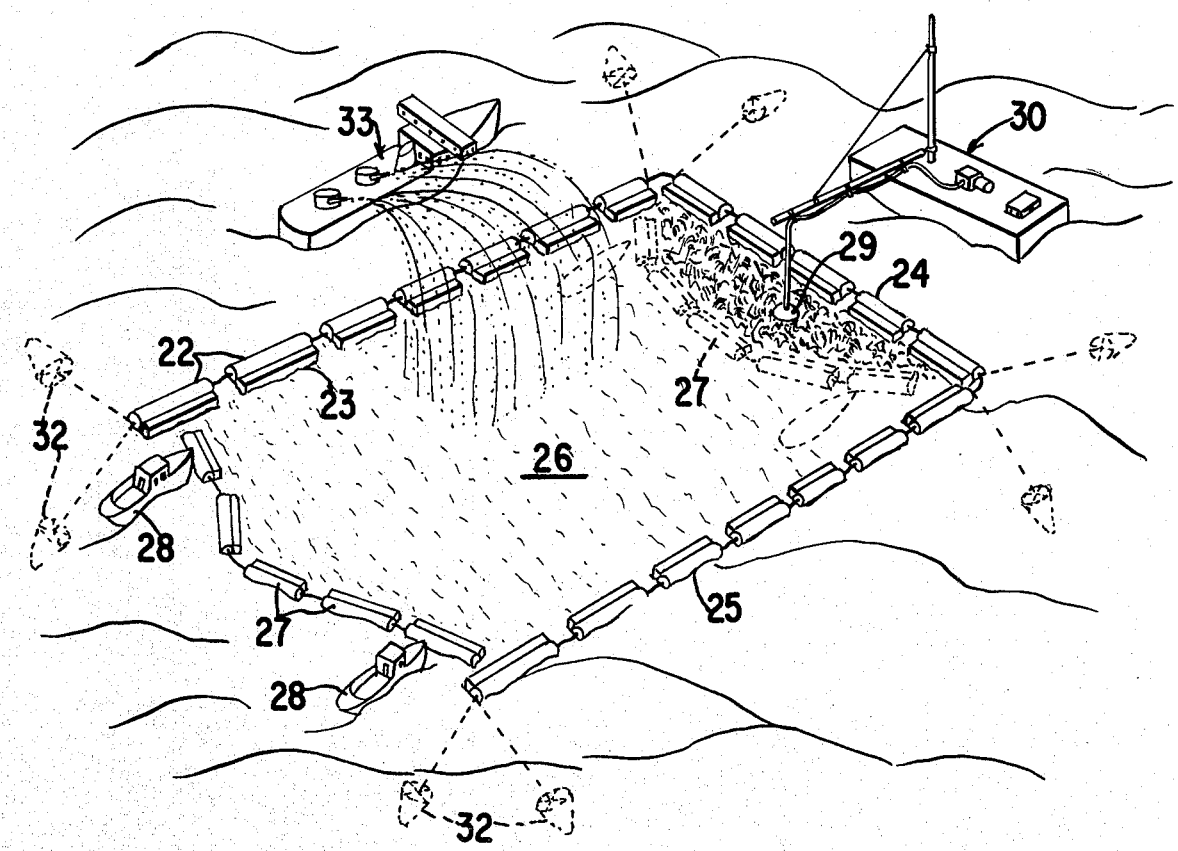

Further objects, features, advantages and applications of this invention will be apparent in accordance with the following description for illustrative purposes of the practice of this invention in connection with the accompanying drawings wherein:

FIG. 1 is a perspective schematic representation of facilities appropriate for use in the practice of this invention, FIG. 2 is a detail elevation on an enlarged scale which illustrates one means by which the booms may be secured to each other in end-to-end pivotal relation, FIG. 3 is an enlarged detail vertical section of a boom of the preferred type in that it has attached thereto means for carrying a block of solid carbon dioxide, FIG. 4 is similar to FIG. 2 but additionally shows refrigerating coils comprised in the booms with a connecting refrigerant line between them, FIG. 5 is a section taken on the line 5—5 of FIG. 4, and FIG. 6 is similar to FIG. 1 except that the facilities shown illustrate the adaptation of the invention to the cleaning up and recovery of an oil spill on water.

In FIG. 1 the body of water 10 is surrounded by a succession of booms 11 which float on the surface of the water. As indicated in FIG. 2 some suitable means for readily securing the booms together in end-to-end pivotal relation may be employed. Preferably the means attaching the booms together is such that the attachment and detachment may be readily accomplished, as, for example, by the use of terminal ring pins 12 through which a pin 13 may pass, the pin 13 being prevented from accidental removal by the use of a cotter pin arrangement 14. Various other attachment devices may also be used such as swivelling pipe fittings or hose connections in conjunction with cables or chains. The booms 11 ordinarily are prevented from drifting as, for example, by the securement thereto at the appropriate locations of lines 15 leading to mooring anchors 16 which hold the booms so as to remain substantially stationary. While the succession of booms has been shown disposed in the form of a rectangle it is to be understood that the configuration of the succession of booms may take any other shape as, for example, a circle or an oval. When the disposition of the booms is such that adjacent boom ends occur at a relatively sharp angle as indicated at 17 appropriate securing means may be employed such as a short length of chain (not shown) the ends of which have eyes which can be secured to the terminal ring pins 12. As shown in FIGS. 1 and 3 each of the booms may be in the form of a hollow cylinder 18 which preferably has attached thereto the bracket 19 which, as shown, comprises a hollow float chamber 20 at the bottom that is of sufficient size to maintain the bracket 19 in position to hold the block of solid carbon dioxide 21 upright in contact with the surface of the water due to the buoyancy provided by the hollow float chamber 20. The boom construction as shown in my U.S. Pat. No. 4,031,707 also is suitable.

Alternatively as shown in FIGS. 4 and 5 adjacent booms 35 may comprise a refrigerant coil 36 disposed so as to be in thermally conductive relation with the surface 37 of the booms so that by the flow of a refrigerant fluid at a cryothermal temperature through the coil 36 the material of the boom surface 37 may be maintained at a cryothermal temperature. In order to maintain the boom in the position shown the booms desirably are provided with an effective amount of ballast 41. As in FIG. 2 the ends of the booms may be interconnected by terminal ring pins 12 for cooperation with the pin 13 and the cotter pin arrangement 14. As mentioned hereinabove, other connecting means also may be employed. So that the regrigerant fluid may flow from the coil 36 in one boom to the coil 36 in an adjacent boom, a flexible hose 38 is provided having readily attachable and detachable connections 38' with oppositely disposed terminals of the coils 36. As illustrated in FIG. 1 a desired succession of booms may be provided with flow of refrigerant fluid at a cryothermal temperature that is supplied through a hose 39 from refrigerating apparatus aboard the vessel 31. Return flow from the refrigerated succession of booms may be provided by a return hose 40. Other booms by suitable hose connections may have refrigerant supplied there from the vessel 31 or some other vessel or vessels. For accomplishing the desired refrigeration conventional refrigerating systems may be employed. For example, a carbon dioxide or an ammonia refrigeration system could be used. Alternatively a mixture of dry ice and alcohol or a slurry of water and ice particles could be pumped through a desired succession of booms.

When the succession of booms 11 has been moored so as to occur in the position illustrated it serves to isolate the surface of the body of water protected by the booms in relation to the surface of water that is peripherally external with respect to the booms. For example, in connection with the arrangement illustrated in FIG. 1 the advance of the wave action as impelled by the wind may approach the succession of booms from the top of the drawing so that the upper two margins of the succession of the booms are the windward margins that provide the principal protection for the body of water within the complete enclosure.

In accordance with this invention when the isolating protection provided by the booms is supplemented by the distribution of a material at cryothermal temperature over a very substantial portion of the surface of the protected body of water, it is possible to greatly reduce surface activity. To this end, and as illustrating preferred practice, a vessel 31 that is in external relation with respect to the succession of booms is provided with means for projecting the material at a cryothermal temperature so as to be cascaded onto the surface of the protected body of water. For this purpose any suitable equipment may be employed. For example, the vessel may be provided with powerful pumps such as those that are employed on fire boats which are capable of projecting a large stream of water through a nozzle so as to play over an extensive area. Prior to leaving the nozzle or just after having left the nozzle the water stream is contacted with a cryogenic substance such as solidified carbon dioxide in fine particle form or liquid nitrogen or any other substance or means by which the sea water or fresh water, as the case may be, may be converted to ice. As hereinabove mentioned another type of equipment which could be used is that which is used extensively to apply artificial snow to ski runs. Preferably as indicated the material at cryothermal temperature is projected from a plurality of nozzles or other sources and the material is projected upwardly at an angle which enables the material to cover as much of the surface area as possible and fall thereon with substantial velocity. The effect of the material at cryothermal temperature as cascaded onto the surface of the water, as aforesaid, is similar to that of a super cold hail which not only has the ability to flatten out an agitated sea but also to chill down the surface of the water, and to some extent the subsurface layers of water so as to enhance internal viscosity, the combined effect being to greatly reduce the surface activity of the water.

While FIG. 1 does not show the presence in the protected body of water 10 of any particular type of equipment, it is to be understood that the quieting of the surface activity of the water within the enclosure provided by the booms is such that it will facilitate the carrying out of any type of operation such as the installation or repair of equipment for oil recovery or the carrying out of a salvage operation.

While in FIG. 1 the succession of booms is shown as completely surrounding the protected body of water 10 the practice of this invention contemplates that the body of water need not in all cases be completely surrounded by the succession of booms. For example, in the case of the arrangement shown in FIG. 1 the booms along a portion or all of the lee side of the protected body of water may be dispensed with. More particularly, the booms along the lower lefthand margin may be omitted at least temporarily as, for example, to permit the entrance and exit of equipment while at the same time enabling the surface activity of the protected body of water to be greatly reduced by the use of the method of this invention.

An operation of the type which may advantageously be carried out, even though a portion of the succession of booms that is along a lee margin of the protected body of water has been omitted, is one for the purpose of cleaning up and recovering petroleum that constitutes an oil spill on water. Such an operation is illustrated in connection with the facilities shown in FIG. 6. For cleaning up and recovering an oil spill the succession of booms 22 is, of course, provided so as to be disposed for protecting as much as possible of the region where the oil spill occurs, there being booms along the windward margins 23 and 24 and also along one of the lee margins 25 thereby providing the protected body of water 26 so that the surface activity thereof is substantially isolated by the presence of the booms in relation to the surface of water that approaches the booms from the windward side. The booms are prevented from drifting by being mounted to the mooring anchor 32. The individual booms 22 are preferably of the type hereinabove described which include means for carrying so as to be presented in contact with the surface of the protected water blocks of solid carbon dioxide or other material at a cryothermal temperature which face the oil floating on the water between the booms 27 and the confinement afforded by the succession of booms 22. The booms 27 may thereafter be moved so as to advance them into the protected body of water 26 by some suitable means such as push-type boats 28. As hereinabove mentioned the floating oil is repelled by the dry ice or other material at a cryothermal temperature presented by the forward faces of the booms and tends to move away therefrom with the result that the floating oil can be readily herded into a smaller area. For example, the oil may be hereded by moving the booms 27 to the position shown in dotted lines where it is confined into a much more restricted area from which it may be removed by some suitable means such as a suction or skimming device 29 so that the oil may be taken into a collecting vessel such as the barge 30.

If the wave activity in external relation with respect to the succession of booms is not excessively heavy, the cleaning up and recovery of the oil spill may be accomplished as hereinabove described without additionally quelling the surface activity by cascading a material at cryothermal temperature onto the surface of the oil of the oil spill. However, the oil recovery is greatly facilitated when the reduction in surface activity afforded by the succession of booms is supplemented by cascading material at a cryothermal temperature, as from the ship 33, so as to fall onto the surface of the oil where the oil spill occurs as, for example, during the period when the booms 27 are being moved for concentrating the spilled oil into a more concentrated region or area and during the pick-up of the oil for transfer to a ship. Moreover, the chilling of the oil itself by increasing its surface tension serves to afford the oil in a condition which facilitates its recovery by an operation such as skimming or suction.

I claim:

1. A method of reducing the surface activity of a body of water which comprises at least partially surrounding a body of water by a succession of booms so that the surface of said body of water is substantially isolated by the presence of said booms in relation to the surface of water peripherally external with respect to said booms and cascading ice particles onto said body of water in sufficient quantity to substantially reduce the surface activity of said body of water.

2. A method according to claim 1 wherein said ice particles as cascaded onto the surface of said body of water are at a temperature substantially below the freezing point of water.

3. A method according to claim 2 wherein said ice particles are cooled to a temperature below the freezing point of water by thermal exchange with cryogenic material.

4. A method according to claim 1 wherein said ice particles prior to cascading are formed by water by thermal exchange between water and a cryogenic material.

5. A method according to claim 4 wherein said ice particles are formed by projecting a stream of water from a nozzle and concomitantly blending therewith a cryogenic material with conversion of the water in said stream into ice particles.

6. A method according to claim 1 which additionally comprises cascading ice particles so as to fall onto water in adjacent peripherally external relation with respect to said booms.

7. A method according to claim 1 which comprises chilling water that is at and adjacent the surface of said body of water and is in opposed relation to the surfaces of said booms that face said body of water by contact with material at a cryothermal temperature presented by said booms.

8. A method according to claim 7 wherein said material at a cryothermal temperature presented by said booms comprises solid carbon dioxide.

9. A method according to claim 1 wherein said booms substantially isolate the major proportion of the surface of said body of water in relation to the surface of water peripherally external with respect to said booms.

10. A method according to claim 1 which comprises substantially completely surrounding said body of water by said succession of booms.

11. A method of reducing the surface activity of a body of water which comprises at least partially surrounding a body of water by a succession of booms so that the surface of said body of water is substantially isolated by the presence of said booms in relation to the surface of water peripherally external with rspect to said booms, distributing on the surface of said body of water so surrounded a material at a cryothermal temperature corresponding to the freezing point of water or lower in sufficient quantity to substantially reduce the surface activity of said so surrounded body of water, and chilling water that is in opposed adjacent relation to the surface of said booms that faces said body of water by contact with a material at said cryothermal temperature presented by said booms, said material at a cryothermal temperature presented by said booms being afforded by flowing a fluid that is at a cryothermal temperature through one or more of said booms in thermally conductive relation with said material.

12. Apparatus for influencing the surface activity of a body of water responsive to contacting said surface water a material at a cryothermal temperature which comprises a succession of elongated buoyant booms which are endwise interconnected and each of which presents a surface for contact with the water surface and has elongated passage means comprised therein disposed for maintaining said surface of said boom in thermally conductive relation with fluid within said passage, means for providing fluid at a cryothermal temperature, means for directing said fluid at a cryothermal temperature from said last mentioned means to said passage in one of said booms, and a flexible hose means for directing said fluid at a cryothermal temperature from said last mentioned passage to the elongated passage comprised in an adjoining boom.

* * * * *